United States Patent
Polonsky et al.

(10) Patent No.: US 10,318,281 B1
(45) Date of Patent: Jun. 11, 2019

(54) SYSTEM, METHOD, AND COMPUTER PROGRAM FOR UPGRADING SOFTWARE ASSOCIATED WITH A DISTRIBUTED, STATE-FULL SYSTEM

(71) Applicant: Amdocs Development Limited, Limassol (CY)

(72) Inventors: Vladimir Polonsky, Ramat-Gan (IL); Ari Erev, Even-Yehuda (IL); Ziv Orovan, Binyamina (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 15/481,260

(22) Filed: Apr. 6, 2017

(51) Int. Cl.
*G06F 9/44* (2018.01)
*G06F 8/658* (2018.01)
*G06F 11/36* (2006.01)
*H04L 12/24* (2006.01)

(52) U.S. Cl.
CPC .......... *G06F 8/658* (2018.02); *G06F 11/3668* (2013.01); *H04L 41/082* (2013.01)

(58) Field of Classification Search
CPC ...................................... G06F 8/658
USPC .................. 717/168–178; 709/203
See application file for complete search history.

(56) References Cited

U.S. PATENT DOCUMENTS

| | | | | |
|---|---|---|---|---|
| 6,457,175 B1 * | 9/2002 | Lerche | ...................... | G06F 8/61 717/173 |
| 6,836,657 B2 * | 12/2004 | Ji | ........................ | G06F 11/1433 455/419 |
| 6,950,863 B1 * | 9/2005 | Pham | ...................... | H04L 67/02 709/220 |
| 7,117,494 B2 * | 10/2006 | Rajaram | ............. | G06F 9/44521 717/174 |
| 7,284,234 B2 * | 10/2007 | Steg | ........................ | H04L 41/22 717/106 |

(Continued)

OTHER PUBLICATIONS

Pina et al, "Atomic Dynamic Upgrades Using Software Transactional Memory", IEEE, pp. 21-25, 2012.*

(Continued)

*Primary Examiner* — Anil Khatri
(74) *Attorney, Agent, or Firm* — Zilka-Kotab, P.C.

(57) ABSTRACT

A system, method, and computer program product are provided for upgrading software associated with an operational distributed, state-full system. In operation, an upgrade system identifies a software upgrade to perform to software associated with a distributed, state-full system. The upgrade system identifies a storage to allocate for performing the software upgrade. The upgrade system identifies one or more customer groups to utilize the software upgrade. The upgrade system identifies a temporary process failure group to utilize for real-time testing of the software upgrade, based on the identified one or more customer groups. The upgrade system removes responsibilities of event servers currently serving the one or more customer groups and moves the one or more customer groups to utilize the software upgrade operating on the temporary process failure group. Further, the upgrade system monitors operation of the software upgrade utilized by the one or more customer groups operating on the temporary process failure group to determine whether there are any issues associated with the software upgrade.

17 Claims, 10 Drawing Sheets

(56) References Cited

U.S. PATENT DOCUMENTS

| | | | | |
|---|---|---|---|---|
| 7,331,063 | B2* | 2/2008 | Gunyakti | G06F 21/10 705/57 |
| 7,461,374 | B1* | 12/2008 | Balint | G06F 8/658 717/174 |
| 7,509,636 | B2* | 3/2009 | McGuire | G06F 8/658 717/168 |
| 7,676,804 | B2* | 3/2010 | Ferguson | B66C 13/18 717/168 |
| 8,191,098 | B2* | 5/2012 | Cooper | G06F 21/10 725/105 |
| 8,239,821 | B2 | 8/2012 | Cook et al. | |
| 8,250,566 | B2* | 8/2012 | Zusman | G06F 8/65 717/171 |
| 8,418,168 | B2* | 4/2013 | Tyhurst | G06F 8/65 717/168 |
| 8,726,264 | B1 | 5/2014 | Allen et al. | |
| 8,739,151 | B1* | 5/2014 | Racz | G06F 8/656 717/168 |
| 8,935,691 | B2* | 1/2015 | Ben Ayed | H04L 67/306 717/169 |
| 8,943,489 | B1* | 1/2015 | Qu | G06F 8/656 717/168 |
| 8,966,467 | B2* | 2/2015 | Sawal | H04Q 3/54516 717/168 |
| 8,984,162 | B1 | 3/2015 | Allen et al. | |
| 8,990,778 | B1 | 3/2015 | Allocca et al. | |
| 9,021,459 | B1* | 4/2015 | Qu | G06F 8/65 710/33 |
| 9,560,081 | B1 | 1/2017 | Woolward | |
| 2014/0280821 | A1 | 9/2014 | Maitland et al. | |
| 2014/0298091 | A1 | 10/2014 | Carlen et al. | |
| 2016/0019053 | A1 | 1/2016 | Gambardella et al. | |
| 2016/0094627 | A1 | 3/2016 | Subramanyam et al. | |

OTHER PUBLICATIONS

Crameri et al, "Staged Deployment in Mirage, an Integrated Software Upgrade Testing and Distribution System", ACM, pp. 221-236, 2007.*

Crameri et al, "Staged Deployment in Mirage, an Integrated Software Upgrade Testing and Distribution System", ACM, pp. 221-236, 2007 (Year: 2007).*

Curino et al, "Automating Database Schema Evolution in Information System Upgrades", ACM, pp. 1-5, 2009 (Year: 2009).*

Burg et al, "Atomic Upgrading of Distributed Systems", ACAM, pp. 1-5, 2008 (Year: 2008).*

Storm, "Continuous Release and Upgrade of Component-Based Software", ACM, pp. 43-57, 2005 (Year: 2005).*

Orovan et al., U.S. Appl. No. 14/218,800, titled "System, Method, and Computer Program for Managing Data Objects in a Multiprocessor Unit Telecommunications Network," filed Mar. 18, 2016.

VMware Corporation, "Alcatel-Lucent® Wireless Cloud Element, Powered by VMware, Enables Flexible, Scalable, High Performance Virtual RNCs," 2013, pp. 1-4.

Microsoft, "Windows 2000 Clustering: Performing a Rolling Upgrade," pp. 1-12, retreived from https://msdn.microsoft.com/en-us/library/bb742504.aspx.

* cited by examiner

SYSTEM, METHOD, AND COMPUTER PROGRAM FOR UPGRADING SOFTWARE ASSOCIATED WITH A DISTRIBUTED, STATE-FULL SYSTEM

FIELD OF THE INVENTION

The present invention relates to upgrading software associated with operational distributed, state-full systems.

BACKGROUND

In software testing, canary testing refers to utilizing programming code changes with a small group of end users. Because the canary is only distributed to a small number of users, its impact is relatively small and changes can be reversed quickly should the new code prove to be buggy.

Implementing a canary upgrade is useful for any distributed system that is supposed to be highly-available and to be always up and running. To date, however, current systems fail to implement canary upgrades on state-full systems.

There is thus a need for addressing these and/or other issues associated with the prior art.

SUMMARY

A system, method, and computer program product are provided for upgrading software associated with an operational distributed, state-full system. In operation, an upgrade system identifies a software upgrade to perform to software associated with a distributed, state-full system. The upgrade system identifies a storage to allocate for performing the software upgrade. The upgrade system identifies one or more customer groups to utilize the software upgrade. The upgrade system identifies a temporary process failure group to utilize for real-time testing of the software upgrade, based on the identified one or more customer groups. The upgrade system removes responsibilities of event servers currently serving the one or more customer groups and moves the one or more customer groups to utilize the software upgrade operating on the temporary process failure group. Further, the upgrade system monitors operation of the software upgrade utilized by the one or more customer groups operating on the temporary process failure group to determine whether there are any issues associated with the software upgrade.

DETAILED DESCRIPTION

Figure 1:
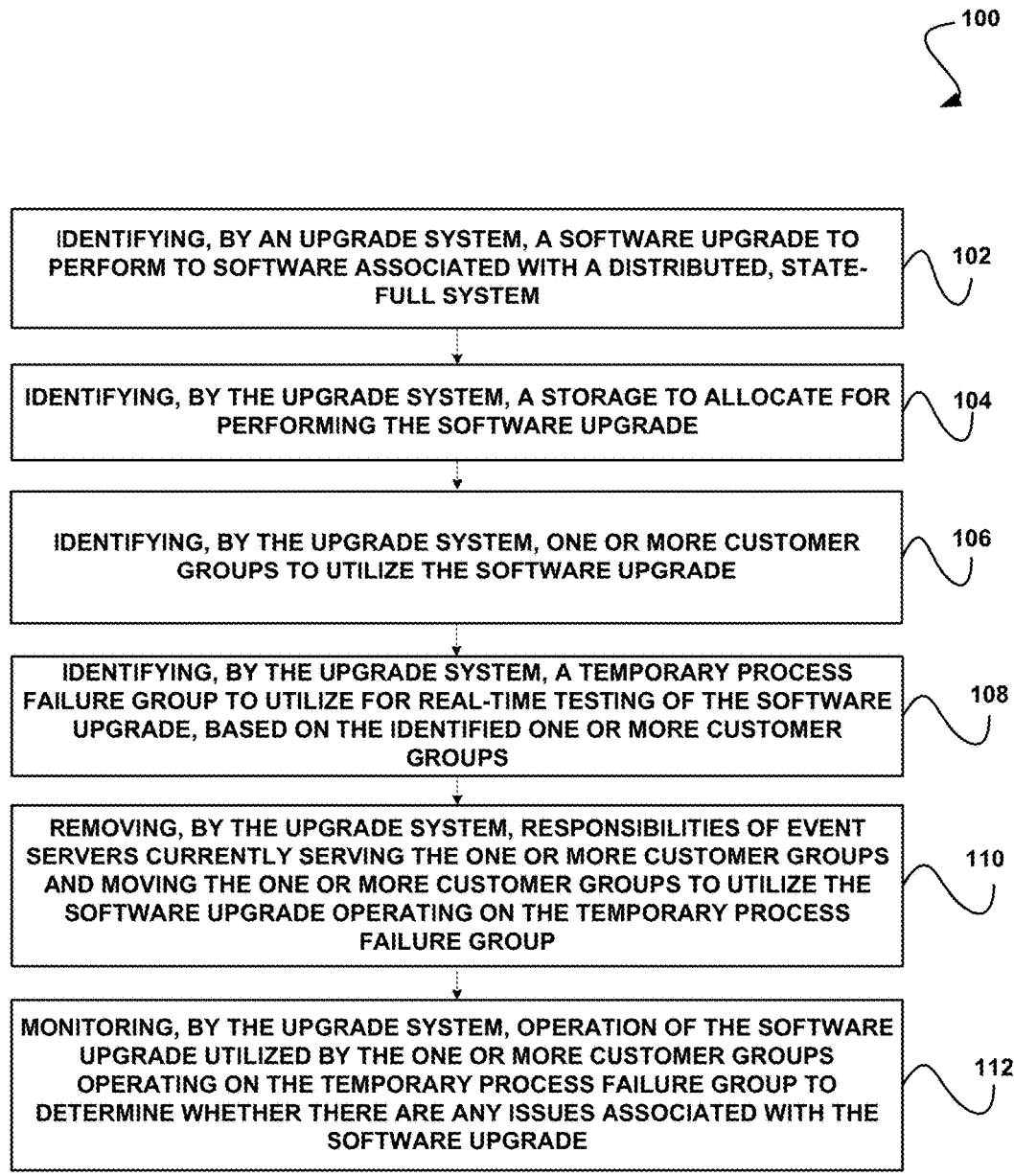
FIG. 1 illustrates a method for upgrading software associated with an operational distributed, state-full system, in accordance with one embodiment.

FIG. 1 illustrates a method 100 for upgrading software associated with an operational distributed, state-full system, in accordance with one embodiment.

In operation, an upgrade system identifies a software upgrade to perform to software associated with a distributed, state-full system. See operation 102. The software may include any software or code being utilized by a plurality of customers. The software upgrade may include any upgrade or code modification to the software.

The upgrade system identifies a storage to allocate for performing the software upgrade. See operation 104. In one embodiment, the storage to allocate for performing the software upgrade may include a portion of existing storage being utilized in association with the software associated with the distributed, state-full system. In another embodiment, the storage to allocate for performing the software upgrade may include new storage. Further, in one embodiment, the storage may be part of storage in an in-memory data grid (IMDG).

The upgrade system identifies one or more customer groups to utilize the software upgrade. See operation 106. The customer groups may be associated with any industry. For example, in one embodiment, the customer groups may be associated with the telecommunication industry.

The upgrade system identifies a temporary process failure group to utilize for real-time testing of the software upgrade, based on the identified one or more customer groups. See operation 108. The process failure group is a close group of processes sharing responsibility for a close group of customer segments. The upgrade system will ensure that events of a particular segment will be treated by the same process in the temporary process failure group.

In state-full system a single process may be responsible for a particular customer group. The temporary process failure group may be associated with a plurality of assigned event servers.

The upgrade system removes responsibilities of event servers currently serving the one or more customer groups and moves the one or more customer groups to utilize the software upgrade operating on the temporary process failure group. See operation 110.

Further, the upgrade system monitors operation of the software upgrade utilized by the one or more customer groups operating on the temporary process failure group to determine whether there are any issues associated with the software upgrade. See operation 112.

In some cases, the upgrade system may determine that there are not any issues associated with the software upgrade. In these cases, the upgrade system may identify additional customer groups to utilize the software upgrade. The upgrade system may then remove responsibilities of event servers currently serving the additional customer groups and move the additional customer groups to utilize the software upgrade. Additionally, the upgrade system may dismiss the temporary process failure group if it is determined that there are not any issues associated with the software upgrade such that the software upgrade is fully implemented as the software upgrade to the distributed, state-full system.

The method 100 may be implemented by the upgrade system to perform upgrades, using different processes that are supposed to do the same type of work, but on different populations and different contexts. The upgrade system uses a small, controlled population (i.e. a canary) for which the context may be maintained separately from the general population. Thus, if the new version fails (it can be a hard crash or a performance drop or anything that does not satisfy results), the upgrade system may return the selected population back to the general population.

If on the other hand, processing in the canary is satisfactory, the upgrade system may move the population and resources in parallel to the new version in a controlled manner. By maintaining the context of the population on an in-memory data grid, and making the mapping from an old version to a new version (and also from new to old), the upgrade system is able to perform migration in an on-the-fly, no downtime manner. The upgrade system may keep state information in persistence memory such that the state can be retrieved by other processing units, thus allowing operation with state-full systems.

It should be noted that the method 100 may be implemented utilizing various systems, hardware, software, applications, user interfaces, etc., as dictated by the implementer. For example, the upgrade system may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
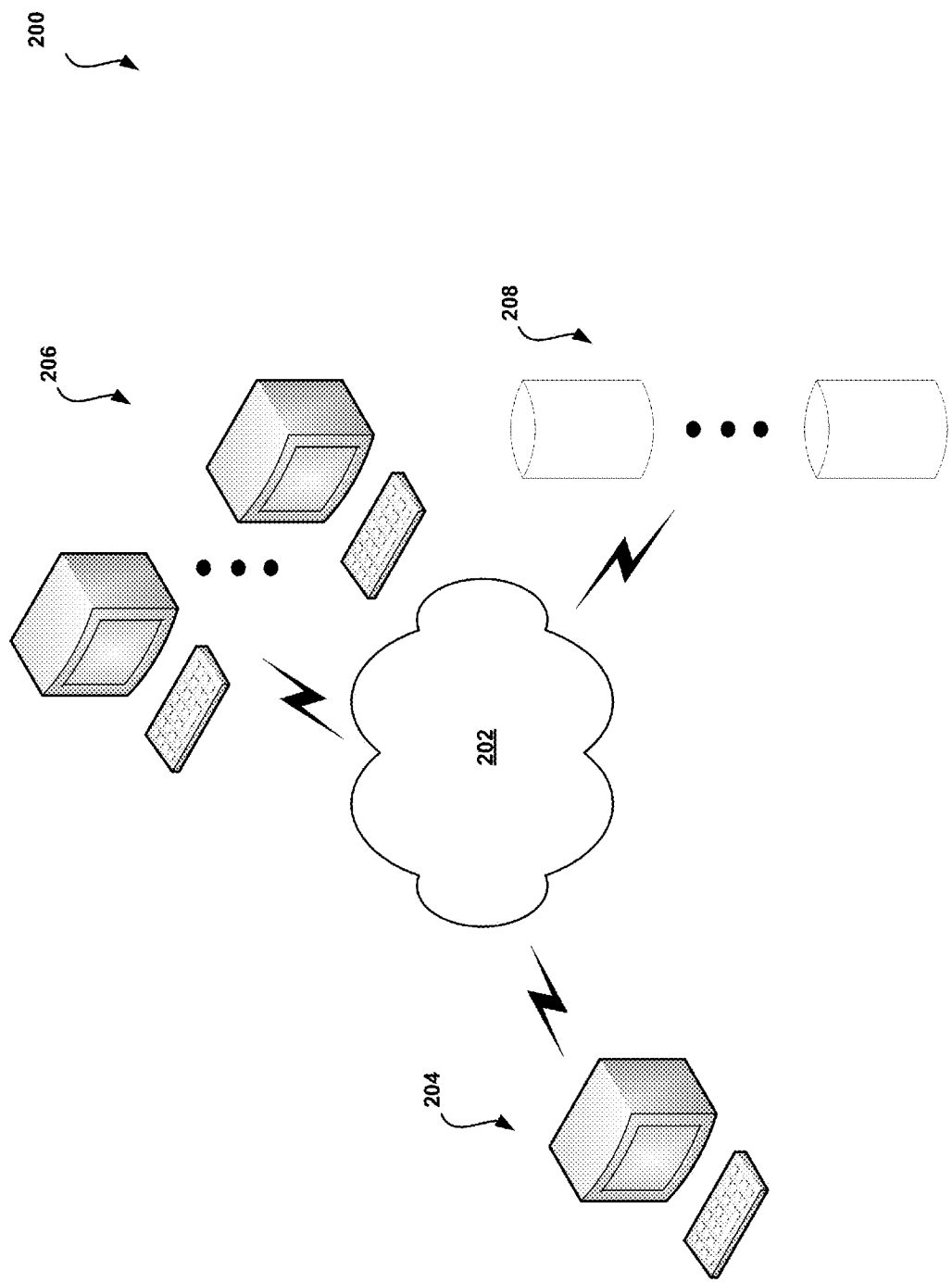
FIG. 2 shows a system for upgrading software associated with an operational distributed, state-full system, in accordance with one embodiment.
Figure 3A:
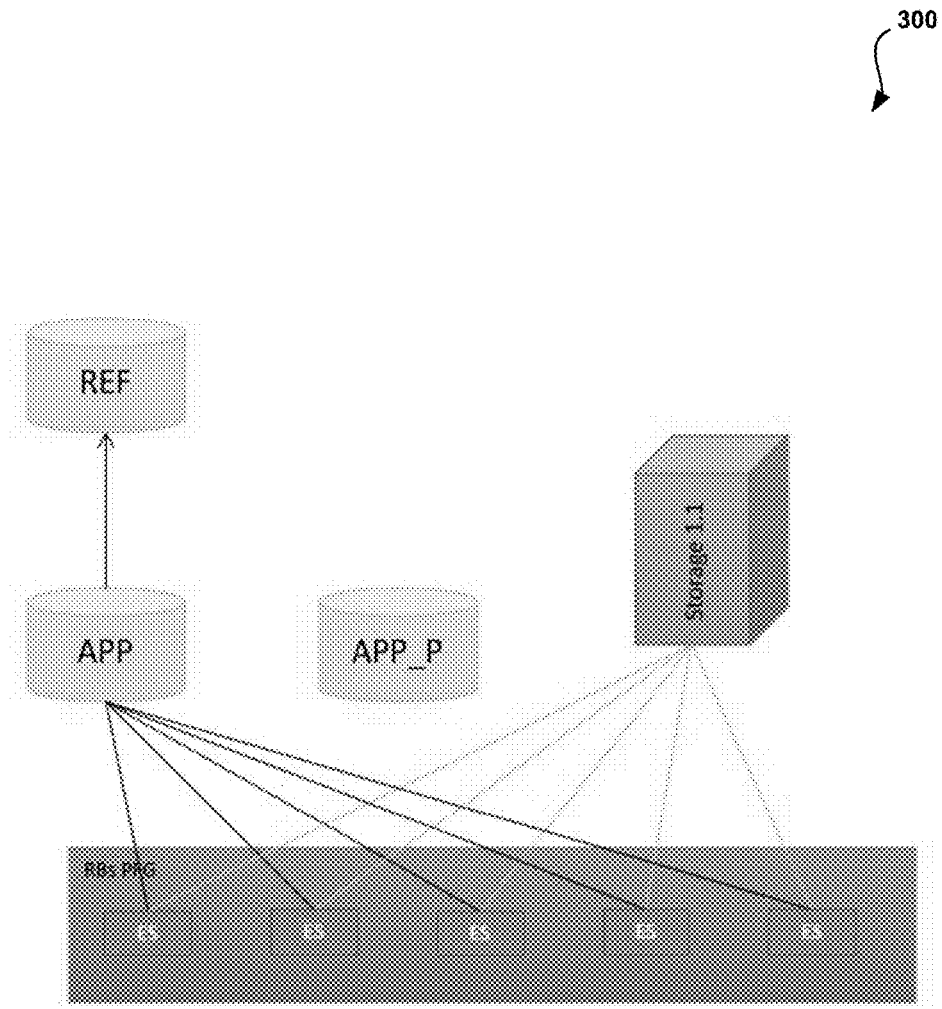
FIGS. 3A-3F show a system flow diagram for upgrading software associated with an operational distributed, state-full system, in accordance with one embodiment.
Figure 3B:
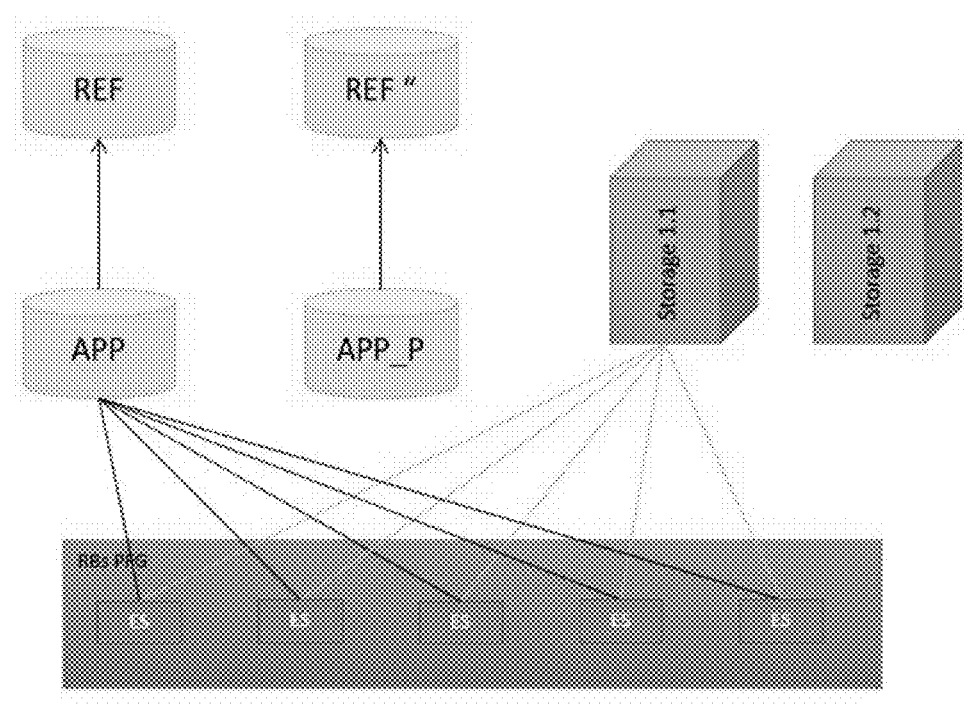
Figure 3C:
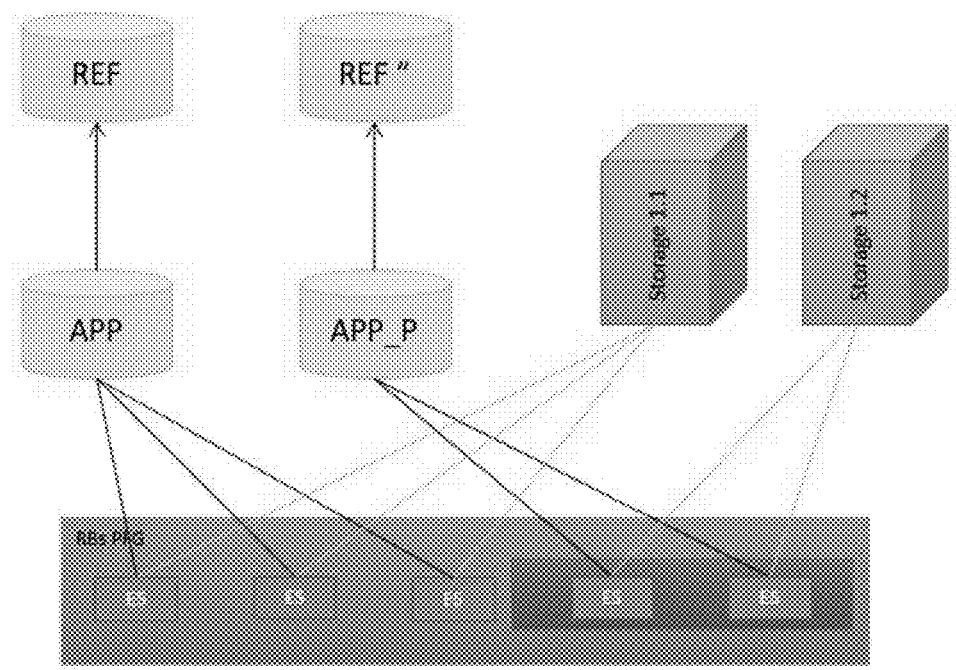
Figure 3D:
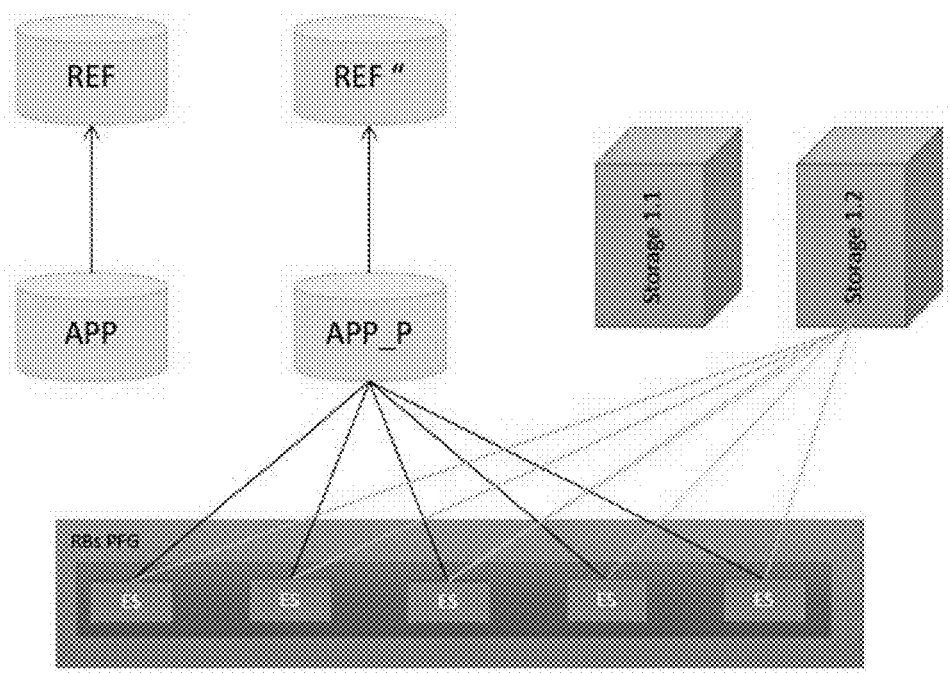
Figure 3E:
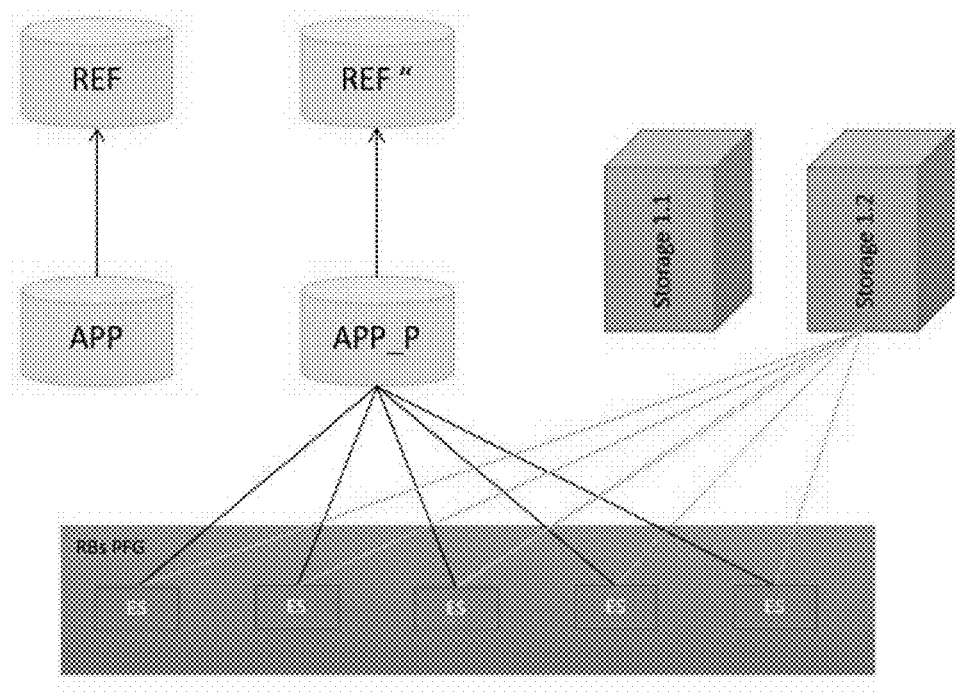
Figure 3F:
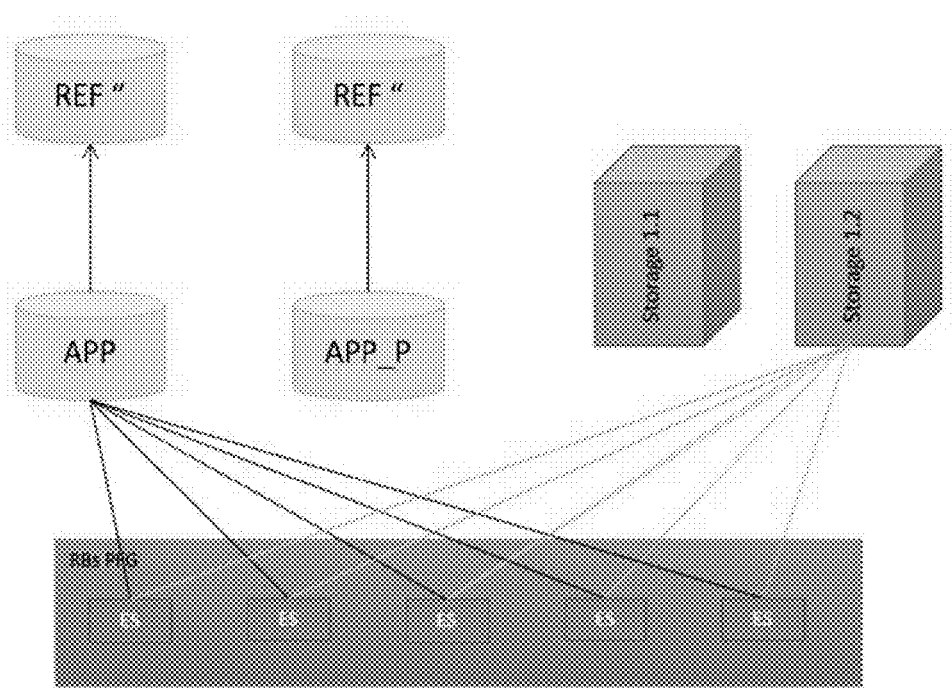

FIG. 2 shows a system 200 for upgrading software associated with an operational distributed, state-full system, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes an upgrade system 204, which may implement a variety of applications or software, etc. The upgrade system 204 may be capable of communicating with a plurality of systems 206, either directly or over one or more networks 202, for performing software updates.

The upgrade system 204 is also in communication with one or more repositories/databases 208, which may serve as a storage areas for current applications or upgrades to be utilized in association with such applications.

Implementing a canary upgrade is useful for any distributed system that is supposed to be highly-available and always be up and running. A canary upgrade of a stateless system often includes utilizing a routing module that routes events of particular segments to new version processes.

In state-full systems, performing a canary upgrade is more complicated because state-full systems require "stickiness", such that events of a particular segment will be treated by the same process (to avoid state synchronization). In the case of a process crash, segments move automatically to other available processes. If a state is corrupted, the other processes will fail.

To overcome a domino effect in the case of customer state invalidation, the upgrade system 204 defines and utilizes a temporary process failure group. The process failure group is a close group of processes sharing responsibility for a close group of customer segments.

In a state-full system, a single process may be responsible for a particular customer group. In one embodiment, an external availability manager process implemented by the upgrade system 204 may have the responsibility for the segment and assignment process. On process failure, a failover process will be chosen by the upgrade system 204 from the same temporary process failure group.

The temporary process failure group may be created/determined utilizing different techniques. For example, in one embodiment, the temporary process failure group may be created by raising new processes within a new implementation/storage. In another embodiment, the temporary process failure group may be created by clearing existing processes from their segments (e.g. by moving segments to other processes of the same failure group), moving cleared processes to the temporary failure group, and restarting the processes in a new implementation/storage.

Once the temporary failure group is created and assigned with processes (e.g. at least two for high availability, etc.), the upgrade system 204 may move one or more representative customer groups from another failure group to the temporary process failure group (by assignment to the processes in the temporary failure group).

In one embodiment, moving the segment from process to process may be performed using the 'Move Group' functionality described in U.S. patent application Ser. No. 14/218,800, titled "System, Method, And Computer Program For Managing Data Objects In A Multiprocessor Unit Telecommunications Network", which is incorporated herein by reference.

Once segments are moved to the temporary process failure group, the upgrade system 204 (or an operator, in accordance with one embodiment) will determine whether the behavior the operation associated with the upgrade is as expected (e.g. there are no errors, issues, failures, etc.). The upgrade system 204 may then push other processes and segments to the temporary process failure group if the operation is as expected. Alternatively, the upgrade system 204 may stop the upgrade and roll back to the old implementation/storage if the operation is not as expected. Such a rollback will be performed from persist layer using the current state.

By introducing routing rules that enable elastic sharding and responsibility assignment to the temporary process failure group, both high-availability and controlled upgrade are enabled.

The upgrade system 204 implements a technique for performing complex upgrades in an environment where "stickiness" of events is required, such as the case where sharding of a population takes place, and the state and context of the customer is stored as part of the processing environment. The upgrade system 204 may keep the state maintained in a Memory Data Grid. This enables the upgrade system 204 to roll-back the changes by cleaning the Memory Data Grid and performing a recovery from a persistence layer (DB).

The upgrade system 204 defines a sub-set of the processes as a close set and relates them to a set of customers. This is considered a "canary" and, if it fails, all the system is rolled back to the old state. If it succeeds, the transfer of population shards and processes in the new environment continues in a controlled manner until the whole population resides on the new version. The upgrade system 204 may implement this technique in a generic case for a specific process running internally for the purpose of upgrading and changing business logic.

FIGS. 3A-3F show a system flow diagram 300 for upgrading software associated with an operational distributed, state-full system, in accordance with one embodiment. As an option, the flow diagram 300 may be implemented in the context of the details of the previous figures and/or any subsequent figure(s). Of course, however, the flow diagram 300 may be implemented in the context of any desired environment. Further, the aforementioned definitions may equally apply to the description below.

As shown, an upgrade system deploys a new reference snapshot (REF") and new storage (Storage 1.2). See FIGS. 3A and 3B.

The upgrade system also chooses customer groups to move into the new version. The upgrade system (e.g. utilizing an availability manager module, etc.) will also calculate a temporary process failure group automatically.

The upgrade system (e.g. utilizing the availability manager module, etc.) will remove responsibilities from chosen event servers and restart the processes in the temporary process failure group with APP_P and Storage 1.2. The upgrade system will also move chosen customer groups into the temporary process failure group. See FIG. 3C.

The upgrade system monitors operation of the upgrade in the temporary process failure group. If the operation is as expected (e.g. no errors, etc.), the upgrade system moves the next portion of customer groups into the temporary process failure group (the upgrade system will add new event servers if needed). See FIG. 3D.

The upgrade system then dismisses the temporary process failure group. See FIG. 3E. The upgrade system then syncs APP to the REF" and returns to APP. See FIG. 3F.

In other systems, upgraded customer/resource groups might move to non-upgraded processes due to a high-availability scenario and, due to this, such systems need to make sure old process can handle new data, which is extremely error prone and risky.

The upgrade system discussed herein creates a temporary cluster of new processes, such that once data is moved to the temporary cluster of new processes, the data will stay there in the event a process fails (and will not return to the old cluster). The upgrade system may perform the roll-back from a persistence layer to preserve data states. Further, in one embodiment, the upgrade system may using Flat Buffers (e.g. Google FlatBuffers, etc.) to enable seamless structures upgrades.

Figure 4:
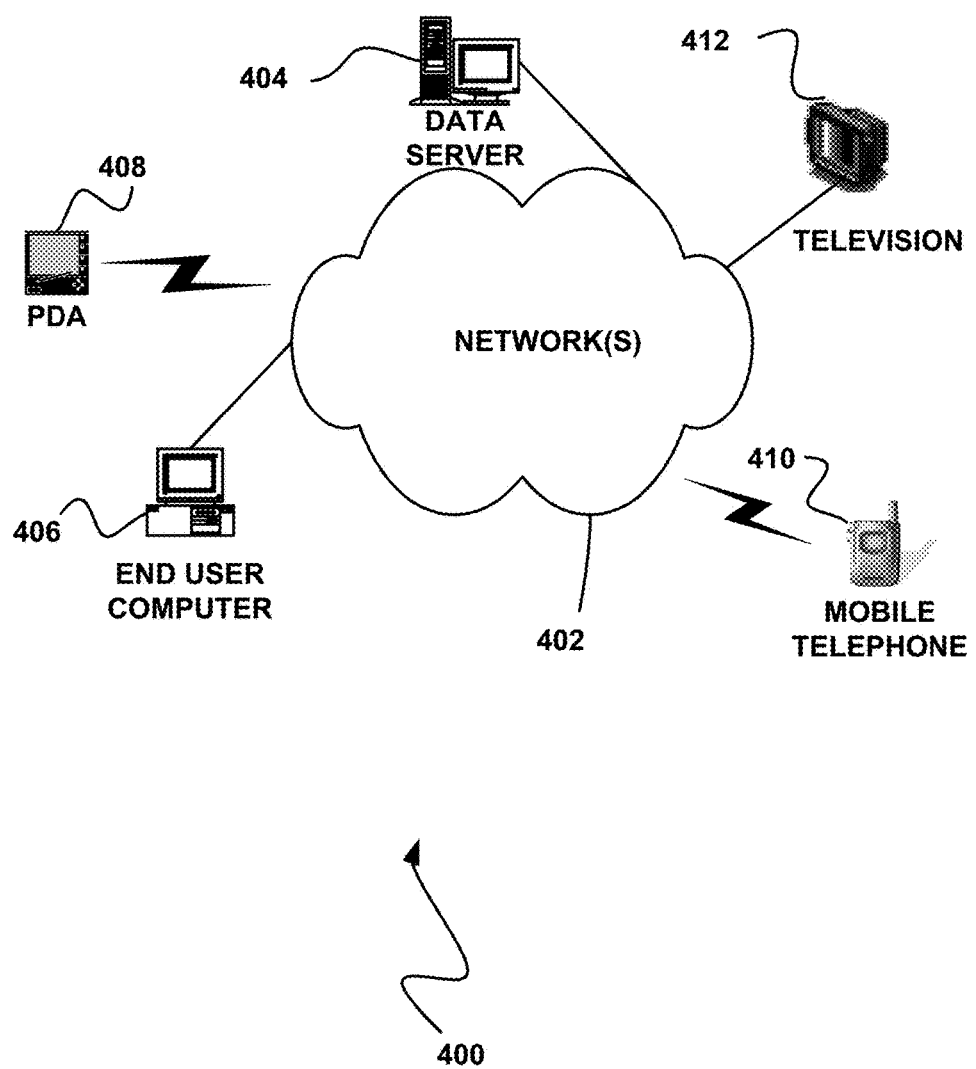
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
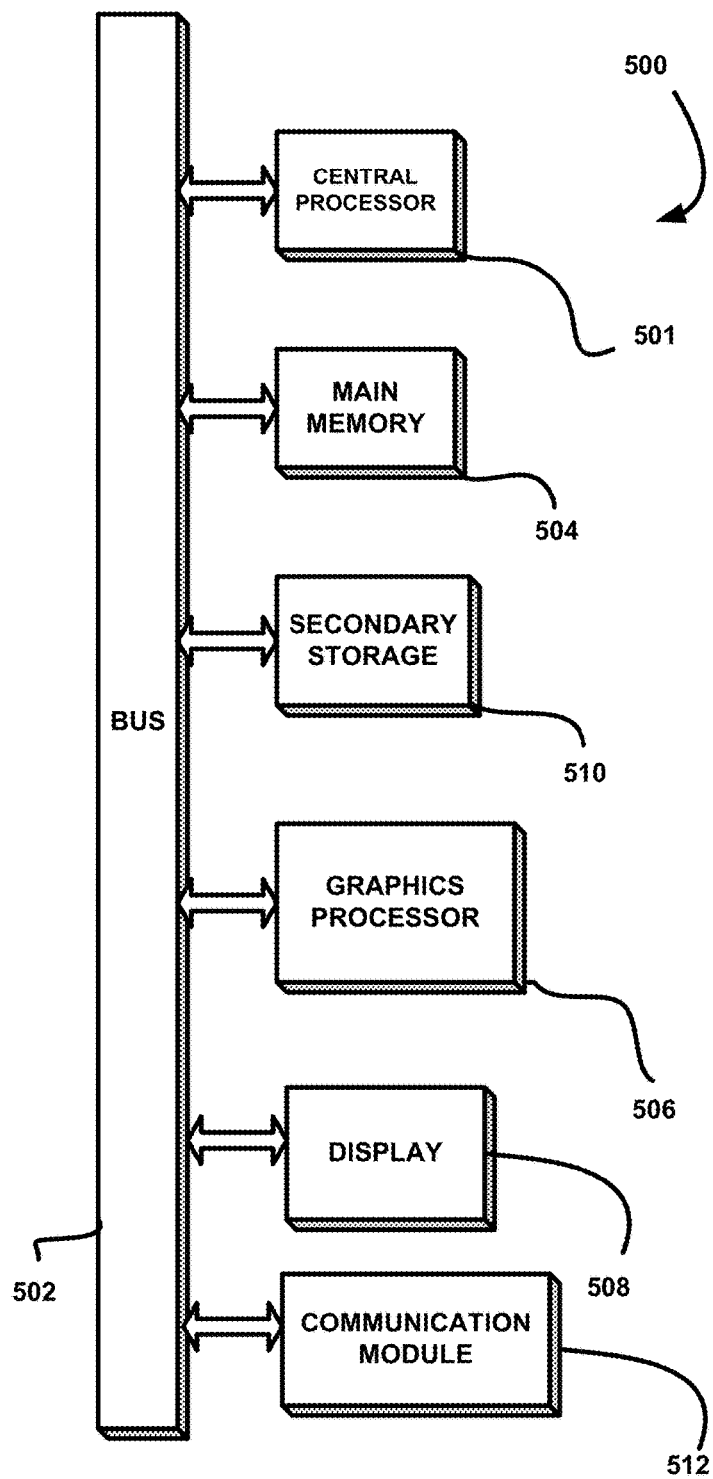
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by an upgrade system, a software upgrade to perform to software associated with a distributed, state-full system;
   identifying, by the upgrade system, a storage to allocate for performing the software upgrade;
   identifying, by the upgrade system, one or more customer groups to utilize the software upgrade;
   creating, by the upgrade system, a temporary process failure group comprised of a plurality of processes raised within the storage for use in real-time testing of the software upgrade, based on the identified one or more customer groups;
   removing, by the upgrade system, responsibilities of event servers currently serving the one or more customer groups and moving the one or more customer groups to utilize the software upgrade operating on the temporary process failure group, by assigning the one or more customer groups to the plurality of processes in the temporary process failure group;
   monitoring, by the upgrade system, operation of the software upgrade utilized by the one or more customer groups operating on the temporary process failure group to determine issues associated with the software upgrade; and
   dismissing, by the upgrade system, the temporary process failure group once it is determined that there are not any issues associated with the software upgrade such that the software upgrade is fully implemented to the distributed, state-full system.

2. The method of claim 1, further comprising identifying, by the upgrade system, additional customer groups to utilize the software upgrade.

3. The method of claim 2, further comprising removing, by the upgrade system, responsibilities of event servers currently serving the additional customer groups and moving the additional customer groups to utilize the software upgrade.

4. The method of claim 1, wherein the storage to allocate for performing the software upgrade includes a portion of existing storage being utilized in association with the software associated with the distributed, state-full system.

5. The method of claim 1, wherein the storage to allocate for performing the software upgrade includes new storage.

6. The method of claim 1, wherein a state and context of the one or more customer groups are stored as part of the processing environment of the temporary process failure group.

7. The method of claim 6, wherein when monitoring of the operation of the software upgrade indicates a failure of the software upgrade, rolling back the one or more customer groups to use of the event servers, wherein the rolling back is performed from a persistent layer using a current state.

8. The method of claim 1, wherein upon failure of one of the processes in the process failure group, a failover process is chosen by the upgrade system from the temporary process failure group.

9. A computer program product embodied on a non-transitory computer readable medium, comprising computer code for:
- identifying, by an upgrade system, a software upgrade to perform to software associated with a distributed, state-full system;
- identifying, by the upgrade system, a storage to allocate for performing the software upgrade;
- identifying, by the upgrade system, one or more customer groups to utilize the software upgrade;
- creating, by the upgrade system, a temporary process failure group comprised of a plurality of processes raised within the storage for use in real-time testing of the software upgrade, based on the identified one or more customer groups;
- removing, by the upgrade system, responsibilities of event servers currently serving the one or more customer groups and moving the one or more customer groups to utilize the software upgrade operating on the temporary process failure group, by assigning the one or more customer groups to the plurality of processes in the temporary process failure group;
- monitoring, by the upgrade system, operation of the software upgrade utilized by the one or more customer groups operating on the temporary process failure group to determine whether there are any issues associated with the software upgrade; and
- dismissing, by the upgrade system, the temporary process failure group once it is determined that there are not any issues associated with the software upgrade such that the software upgrade is fully implemented to the distributed, state-full system.

10. The computer program product of claim 9, further comprising computer code for identifying, by the upgrade system, additional customer groups to utilize the software upgrade.

11. The computer program product of claim 10, further comprising computer code for removing, by the upgrade system, responsibilities of event servers currently serving the additional customer groups and moving the additional customer groups to utilize the software upgrade.

12. The computer program product of claim 9, wherein the storage to allocate for performing the software upgrade includes a portion of existing storage being utilized in association with the software associated with the distributed, state-full system.

13. The computer program product of claim 9, wherein the storage to allocate for performing the software upgrade includes new storage.

14. An upgrade system for implementing a method comprising:
- identifying, by the upgrade system, a software upgrade to perform to software associated with a distributed, state-full system;
- identifying, by the upgrade system, a storage to allocate for performing the software upgrade;
- identifying, by the upgrade system, one or more customer groups to utilize the software upgrade;
- creating, by the upgrade system, a temporary process failure group comprised of a plurality of processes raised within the storage for use in real-time testing of the software upgrade, based on the identified one or more customer groups;
- removing, by the upgrade system, responsibilities of event servers currently serving the one or more customer groups and moving the one or more customer groups to utilize the software upgrade operating on the temporary process failure group, by assigning the one or more customer groups to the plurality of processes in the temporary process failure group;
- monitoring, by the upgrade system, operation of the software upgrade utilized by the one or more customer groups operating on the temporary process failure group to determine whether there are any issues associated with the software upgrade; and
- dismissing, by the upgrade system, the temporary process failure group once it is determined that there are not any issues associated with the software upgrade such that the software upgrade is fully implemented to the distributed, state-full system.

15. The upgrade system of claim 14, further comprising identifying, by the upgrade system, additional customer groups to utilize the software upgrade.

16. The upgrade system of claim 15, further comprising removing, by the upgrade system, responsibilities of event servers currently serving the additional customer groups and moving the additional customer groups to utilize the software upgrade.

17. The upgrade system of claim 14, wherein the storage to allocate for performing the software upgrade includes a portion of existing storage being utilized in association with the software associated with the distributed, state-full system.

* * * * *